United States Patent
Oh et al.

(10) Patent No.: US 9,191,451 B2
(45) Date of Patent: Nov. 17, 2015

(54) SYSTEM AND METHOD FOR AUTOMATIC SELECTION OF A CONTENT FORMAT

(71) Applicant: LinkedIn Corporation, Mountain View, CA (US)

(72) Inventors: Yingfeng Oh, Mountain View, CA (US); Romer Rosales, Mountain View, CA (US); Nihar Mehta, Mountain View, CA (US)

(73) Assignee: LinkedIn Corporation, Mountain View, CA (US)

(*) Notice: Subject to any disclaimer, the term of this patent is extended or adjusted under 35 U.S.C. 154(b) by 375 days.

(21) Appl. No.: 13/874,050

(22) Filed: Apr. 30, 2013

(65) Prior Publication Data

US 2014/0325055 A1 Oct. 30, 2014

(51) Int. Cl.
*G06F 15/16* (2006.01)
*G06F 3/00* (2006.01)
*H04L 29/08* (2006.01)
*G06Q 30/02* (2012.01)

(52) U.S. Cl.
CPC .............. *H04L 67/22* (2013.01); *G06Q 30/02* (2013.01); *H04L 67/20* (2013.01)

(58) Field of Classification Search
CPC . G06F 17/211; H04L 29/08756; H04L 67/22; H04L 67/20
See application file for complete search history.

(56) References Cited

U.S. PATENT DOCUMENTS

| | | | |
|---|---|---|---|
| 2005/0039136 A1* | 2/2005 | Othmer | G06F 17/30905 715/774 |
| 2007/0300152 A1* | 12/2007 | Baugher | 715/522 |
| 2009/0112701 A1* | 4/2009 | Turpin et al. | 705/10 |
| 2010/0106595 A1* | 4/2010 | Baugher | 705/14.42 |
| 2011/0153413 A1* | 6/2011 | Chunilal | 705/14.42 |
| 2011/0213655 A1* | 9/2011 | Henkin et al. | 705/14.49 |

* cited by examiner

*Primary Examiner* — Tamara T Kyle
(74) *Attorney, Agent, or Firm* — Park, Vaughan, Fleming & Dowler LLP; Daniel E. Vaughan

(57) ABSTRACT

A system and method are provided for automatically selecting one of multiple formats in which to serve a content item. The system collects data regarding content items served and user activity and/or revenue regarding those served items. These data are used to calculate performance values or scores of each format for specified factors such as destination (e.g., a web domain, a URL, a content channel), visibility (e.g., above the fold), a period of time, a vertical or type of content, and so on. When a new content request is received, the format selected for serving in response to the request is chosen based on the competing formats' calculated performances, and a suitable content item is selected. The selected format may be the format likely to generate the most revenue, may be selected by statistical sampling, or may be selected by using the performance values/scores in some other way.

21 Claims, 3 Drawing Sheets

SYSTEM AND METHOD FOR AUTOMATIC SELECTION OF A CONTENT FORMAT

BACKGROUND

This invention relates to the field of computer systems. More particularly, a system and methods are provided for automatically selecting an optimal format of an electronic content item in response to a request for a content item.

Many computer systems are operated to serve electronic content such as web pages, advertisements, audio files, visual files and so on in response to corresponding requests. However, there is often little effort made to select and serve a given content item with an optimal format or a format likely to achieve a suitable goal, such as enhancing revenue or, conversely, to more equally serve multiple competing formats. Instead, the version that is served may simply be one that matches parameters of a given request or that a content server chooses to serve for some other reason.

DETAILED DESCRIPTION

Figure 1:
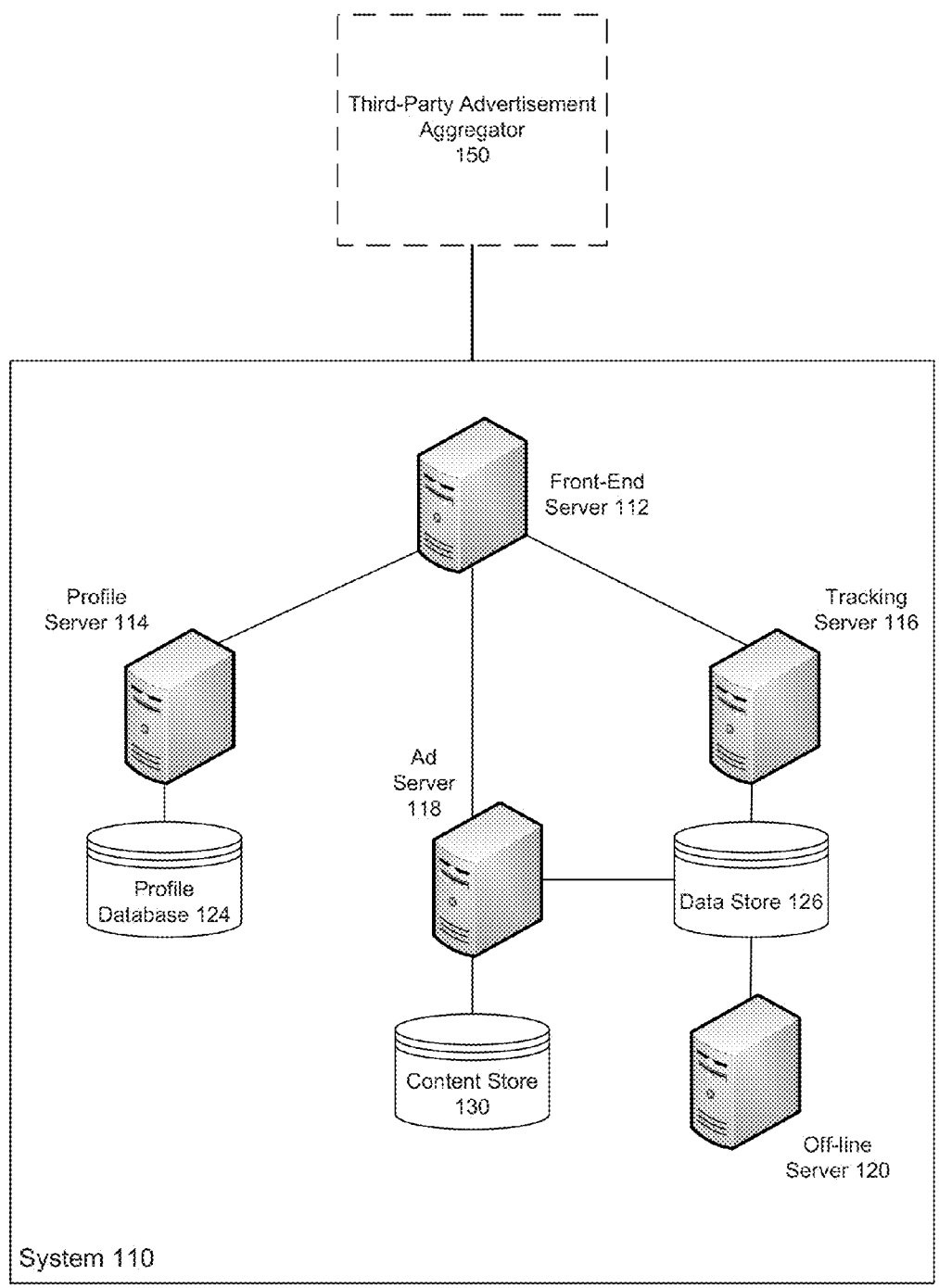
FIG. 1 is a block diagram depicting a system for automatically selecting and serving a content item with an optimal format, in accordance with some embodiments of the invention.

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, a system and method are provided for automatically selecting and serving a format of a selected content item, based on past and/or predicted performances of competing formats. In these embodiments, a content-serving system receives a request for a content item, accompanied by one or more attributes that may help the system choose a content item to be served. Based on calculated performances, one of multiple competing formats of the chosen content item is selected and served.

Different formats of a given content item may illustratively contain different numbers of sub-items (e.g., multiple ads within one advertisement slot), have different sizes, include different images, have different wordings or messages, employ different backgrounds or foregrounds (e.g., colors), feature different effects (e.g., flashing), different fonts, contain different media types (e.g., video, sound), etc. For some types of content items (e.g., news stories, images), formats may differ according to these factors and/or others (e.g., language, resolution).

Some embodiments of the invention are described as they are applied to serve advertisements, wherein the "performance" of a given content item (e.g., an ad impression) or a given ad format may relate to its click-through rate (CTR), its average earnings per request/serving, user engagement or some other measure of the activity or revenue it leads to. In other embodiments, other types of content are served, with their performance possibly also depending on the revenue they generate or on other factors, such as how well they satisfy the users to whom they are served, how many "likes" or "dislikes" they spawn, how many comments they elicit, etc.

In embodiments of the invention, the system performs parallel operations of calculating the performances of the different formats of advertisements or advertisement impressions, and of serving those different formats in response to ad requests.

Calculating the performances of the different formats entails collecting data regarding the served advertisements (e.g., what format is served, where it is served to, when it is served) and data regarding the performance of each serving (e.g., revenue, user clicks), and processing the collected data to obtain measures of each format's performance. In different implementations, different data may be collected and processed to determine and to compare the performances of the different formats.

Illustrative data that may be captured include the destination of a served advertisement format, the "vertical" or type of content with which it is served, the visibility with which it was presented (e.g., how prominently it was displayed, the position or location in which it was served on a page), the size of the format, the type of user to whom it was served, when it was served, whether the user to whom it was served acted on it (e.g., by clicking on it, by providing information requested in conjunction with the ad), demographics of the user (e.g., location, gender), etc. In different implementations, the destination of an advertisement may be a domain (e.g., acme.com), a sub-domain, a web page, a network address (e.g., a URL or Uniform Resource Locator), a content channel or some other environment or location in which the advertisement was served.

In some embodiments of the invention, calculating and comparing the performances of different advertisement formats may entail gathering data for all ad formats that were served within a specified period of time to a specified destination, regardless of the advertisement or impression served in that format. In some other embodiments, performance measurements also consider other parameters (e.g., vertical, visibility, size).

Thus, with other circumstances being equal (e.g., destination, time frame, size), a comparison of different formats' performances allows the system to predict that some formats will perform better than others under similar circumstances in the future. Separate calculations and comparisons may be made for each unique combination of parameters. For example, in an implementation in which formats' performances are to be compared for multiple domains and multiple time periods, separate calculations are performed for each destination and each time period.

As already mentioned, these calculations may be executed on a regular or continual basis, and may be performed in parallel with serving of the advertisements, so that the ad formats' performances are immediately available to decide which format to serve in response to a new ad request. As one alternative, multiple formats' performances may be calculated in real-time when an ad request is received, using the destination of the requested ad and a suitable time period (e.g., the past 7 days, the past two weeks) as parameters.

The serving of advertisements entails selecting a format based on the calculated performances of multiple formats of the ad impressions, and selecting an ad impression to serve with that format. In some implementations, this may be reversed to first select an impression and then select a format in which to serve it.

When a new request for an advertisement is received, the system may use attributes provided with the request (e.g., destination, size), to identify an ad format to serve. Any number of suitable advertisements may be considered for serving in the selected format, from the same or different advertising campaigns. As already mentioned, formats may differ according to size (e.g., 300 by 250 pixels, 728 by 90 pixels), number of distinct ads or ad messages, color (e.g., of a background, of a foreground, of text), font, some other aspect of their appearance, and/or other characteristics.

In an illustrative implementation, performance measurements or scores of different formats are normalized (e.g., to values between 0 and 1), and a sample of the distribution of values is taken so that, over time, the frequency with which each format is selected for serving may approximate its performance relative to the other formats. In other implementations, the selection process may be biased to more strongly favor formats that produce higher revenue, may be modified to treat all formats approximately equally, or may be otherwise adjusted.

After it is served, any follow-on activity regarding the served impression is recorded and added to the performance data, as indicated above. For example, the user to whom the impression is served may click on the impression, thereby increasing its CTR and/or generating income on a cost-per-click (CPC) basis. Such activity is stored, including the format, the advertisement impression and some or all attributes associated with the ad and/or the serving of the ad.

In some embodiments of the invention, one significant difference between different ad formats is the number of ads, impressions or creatives accommodated in a particular size. For example, a request may specify a size (e.g., a slot size) in which the served advertisement(s) will be displayed, and the system may be able to place multiple creatives within that space (e.g., two, three, nine). Thus, in these embodiments, part of the process of determining what to serve in response to a request may entail consideration of different formats that have different number of creatives combined and served together.

One factor that may be considered when deciding between formats accommodating different numbers of advertisements is how the performance of the advertisements is being measured. Illustratively, if the system earns revenue on a CPM basis, it may be more lucrative to serve formats containing more creatives. Conversely, it may turn out that when revenue is earned based on clicks (e.g., the click-through rate), it may be more lucrative to serve formats having fewer creatives.

FIG. 1 is a block diagram of a system for automatically selecting and serving a content item with a format calculated to achieve a goal such as maximum revenue, maximum click-through, fairness among competing formats, and so on, according to some embodiments of the invention. System 110 hosts a social networking service, a portal site, a search engine or some other service, which users access via a suitable software application (e.g., a web browser). In one particular implementation, system 110 is a social networking site that focuses on members' professional statuses, connections, activities and aspirations.

In these embodiments, requests for advertisements and/or other content are received at front-end server 112, which may comprise a web server, an application server, a data server and/or other software modules for facilitating the serving of content in response to requests. System 110 also includes profile server 114, tracking server 116, advertisement server 118, off-line server 120, profile database 124, tracking database(s) 126 and content store 130.

Profile server 114 maintains profiles, in profile database 124, of members or users of a service hosted by system 110. A member's profile may reflect any number of attributes or characteristics of the member, including personal (e.g., gender, age range), professional (e.g., job title, employer), social (e.g., organizations the user is a member of, geographic area of residence), educational (e.g., degree, university attended), etc. The social-networking aspect of system 110 allows members to view other members' information, form relationships with each other, search for employment opportunities, find professional contacts (e.g., a mentor, a possible client, a possible business partner), obtain information regarding a particular person or business, etc.

When a member connection or a request for content to serve to a member is received at front-end server 112, the system retrieves some or all data constituting the corresponding member's profile from the profile server. The profile data may be shared throughout system 110 to accompany various actions or communications, such as when an advertisement is requested from ad server 118, when a record of activity is stored at tracking server 116, and so on.

Tracking server 116 monitors and records activity of system 110 and users of the system (e.g., in tracking database(s) 126). For example, whenever content is served from front-end server 112, the tracking server records attributes of the transaction, such as (but not limited to) the campaign/ad/impression/creative(s) served, the format in which the content was served, to whom it was served (e.g., a member ID) or where it was destined to be displayed (e.g., a domain, a URL, a content channel), a timestamp, etc. Similarly, the tracking server also records member or user actions regarding content items presented to them (e.g., clicks, follow-on requests), to include identities of the member/user and the advertisement (or other content item) acted on, what action was taken, etc.

Measuring the performance of a campaign, impression or a particular format of an impression, or of some other content served by system 110, may be performed on tracking server 116, one of the other servers of system 110 and/or some other system component. For example, off-line server 120, which may be optional in other embodiments of the invention, comprises a set of hardware and/or software resources configured to regularly or constantly calculate the performance of different ad impression formats so that when a new content request is received, an item can be served in a format that is predicted to further a goal (e.g., earn revenue, generate user activity).

While off-line server 120 operates off-line in the illustrated embodiment of the invention to generate performance data for different content item formats, in other embodiments, some or all performance calculations may be performed on-line or even in real-time as ad requests are received. In either case, a given format's calculated performance may be re-calculated or updated whenever new performance data are received (e.g., as a result of serving that format again), at regular intervals, or with some other frequency.

Ad server 118 maintains one or more repositories of advertising content for serving to users and members (e.g., content store 130), an index of the content items, and possibly other information. Ad server 118 receives ad requests via front-end server 112, which may originate there and/or at other sources. For example, in some embodiments of the invention, system 110 receives ad requests or solicitations from third-party advertisement aggregator 150, which may be an entity that interfaces between publishers of electronic content (e.g., web domains, web pages) and providers of advertisements for serving with the electronic content. In some implementations, aggregator 150 is the DoubleClick Ad Exchange by Google® and system 110 may participate in real-time bidding to provide advertisements via the aggregator.

In other embodiments of the invention, ad server 118 receives ad requests for serving to members in conjunction with content hosted by system 110. Such requests may come from front-end server 112, some other application server or web server, or some other component of the system. Because the ad server serves ads to accompany content served by system 110 and/or content providers external to the system, references to a destination of an ad served by ad server 118 should be understood to encompass any electronic site that displays advertisements in association with other content, regardless of whether that other content is served by system 110 or a third party.

In particular, a "destination" of an advertisement impression served by system 110 toward aggregator 150 or some other third-party may be a domain (or sub-domain) not associated with system 110, a web page or URL not hosted by system 110, a content stream (or "vertical") hosted by some other system, etc. In contrast, a "destination" of an advertisement impression served to a member connected to front-end server 112 (or some other system component) may be a particular content channel (e.g., job listings, a profile of a particular company or individual member of the service, a home page), a domain or sub-domain associated with system 110, a web page or URL hosted by system 110, etc.

System 110 may include other components not illustrated in FIG. 1, such as an index of the ads maintained by ad server 118, an analysis module operating on tracking server 116 (and/or elsewhere) to analyze stored data, and/or other components. Also, in other embodiments of the invention, functionality of a system for serving electronic content as described herein may be distributed differently.

For example, the functionality of system 110 may be distributed differently among the illustrated components by merging or further dividing functions of one or more components, or may be distributed among a different collection of components. Yet further, while implemented as separate hardware components (e.g., computer servers) in FIG. 1, components such as front-end server 112, profile server 114, tracking server 116, ad server 118 and off-line server 120 may alternatively be implemented as separate software modules executing on one or more computer servers, such as within a virtual computing system.

In some embodiments of the invention, the performance of a particular format of a given advertisement impression is measured by the observed click-through rate (CTR) or the revenue it generates. In other embodiments, performance may be measured in some other way.

When performance is measured by user activity, such as CTR, a format's performance may be determined directly from the data collected when impressions are served with that format. In particular, and as described above, the system is notified when a user to whom an ad impression is served clicks on the impression.

When performance is measured by the revenue generated by a format of an impression, the system may examine the revenue it receives due to each transaction that causes revenue. For example, if an operator of system 110 charges advertisers on a cost-per-click (CPC) model, each time a member or user clicks on an ad impression provided by the system, the operator may earn income. As another example, if the system operator charges on a cost per impression model (e.g., CPM or cost per one thousand impressions), each impression that is served may earn income for the operator (e.g., 0.001 of the CPM) or a portion of a budget that an advertiser is willing to pay for some number of impressions.

To allow for a meaningful comparison between different advertisement formats, the system may define a set of parameters regarding how/where/when the formats were served and calculate the performances of the competing formats (e.g., alternative formats of a given ad impression) based on those parameters. As indicated above, illustrative parameters include the destination of ad impressions and a "window" of time during which the impressions were served. For each of multiple permutations of the specified parameters, separate performance values or scores of competing formats are computed and can be used to select a format to serve in response to a new request.

By calculating the performance of each ad format in regard to a specific destination, the performance of individual formats when served to that one destination can be isolated and compared. Each destination may be defined as finely (e.g., a specific URL) or coarsely (e.g., a web domain) as desired.

By considering a particular period or window of time, the system will only consider ad impressions served to the specified destination during that time period when it calculates and compares the performance of different formats of an impression. For example, a window may be defined to encompass three days. Then, when calculating and comparing the performance of multiple formats, only revenue/activity generated by impressions having those formats and served during the previous three-day period will be considered.

The size or length of a time window may vary in different embodiments of the invention and/or depending on other information regarding served content. For example, if a pattern of activity (e.g., ad requests, ad servings, user traffic, user activity regarding ads) is very cyclical at a particular destination, the window of time used to identify qualifying transactions (i.e., servings of ad impressions) may be defined to encompass a full cycle, whether it is one day long, one week long, fifteen days long, one month long, etc. In some implementations, the duration of a window of time may be proportional to how predictable traffic is at the destination currently being considered. Thus, for a destination characterized by highly random or variable traffic, a shorter window of time may be used than for a destination whose traffic pattern is very regular.

Another parameter that may be considered when calculating formats' performances is a "visibility" parameter that indicates the prominence or visibility with which an ad impression is served. For example, a request that leads to the serving of an advertisement may indicate that the ad will be displayed "above the fold" or "below the fold" (indicating whether the ad will be viewable without the viewer having to scroll his or her display), may identify a specific or general location of the ad within a page of content (e.g., top, right-side, bottom), etc.

Yet another parameter is the "vertical" or industry or type of content in or with which an ad impression is served, such as "politics," "sports," "news" and so on. Different embodiments of the invention may employ any of the parameters described herein, and/or others.

System 110 may calculate performance values or scores for any number of ad formats, depending upon the destinations, time windows, visibilities, verticals and/or other parameters to be considered. These calculations may be performed on-line and/or off-line, but are generally repeatedly updated so as to have "fresh" performance scores available for consideration when the system must select a format in which to serve an ad in response to a new ad request.

In some embodiments of the invention, along with calculating performance values or scores for each of multiple competing formats (e.g., multiple formats of a single ad impression), the average of the competing formats' performances may also be computed, and/or other values (e.g., the median performance). In these embodiments, the average performance may be used in the event a new format of the same impression becomes available. Because there will be no performance data for that new format, its performance may appear to be zero and it might never be served. Instead, by assigning it the average of all competing formats' performances for some period of time (e.g., two days, one week), it will selected for serving and will generate corresponding performance data.

In some embodiments of the invention, if a competing format is removed from competition, its performance value or score may be distributed among the surviving formats. For example, the format's normalized score may be divided by the number of remaining formats and the result added to each of their normalized scores.

In some embodiments of the invention, a back-off mechanism is employed to facilitate selection of a suitable ad impression format when no performance values or scores are available that exactly or closely match attributes of a new ad request. This mechanism may entail calculating performances of some or all formats not only for permutations of specific parameter values as discussed above, but also for permutations that employ wildcards for one or more parameters.

For example, calculations of some formats' performances may use specific values for four default parameters: size (e.g., 300×250), destination (e.g., web domain xyz.com, a content channel containing job listings), vertical (e.g., politics) and visibility (e.g., above-the-fold). Specifically, performance data regarding the formats' performances when served for ad requests having matching attributes is analyzed to generate performance numbers for these specific parameter values. If another ad request is received having attribute values that exactly match these parameter values, the calculated performance values can be directly used to select one of the formats to serve.

However, to allow for a situation in which an ad request's attributes do not exactly match the parameter values for which performances were calculated, other performance values may be calculated using wildcards for one or more parameters. To continue the example introduced above, performance data for the formats when served for ad requests having attribute values that match the specified size (300×250), destination (xyz.com) and visibility (above-the-fold) may be analyzed regardless of the vertical for which the formats were served. In other words, all values for the vertical parameter are accepted. Then, if an ad request is received having attributes that match the size, destination and visibility values, but with an unknown, unrecognized or missing value for the vertical parameter, the corresponding performance values can be used to select a format.

Multiple alternative performance values may be calculated for back-off purposes—such as four alternative values with each having a wildcard for one of the four default parameters, other values reflecting wildcards for multiple parameters, and so on. Then, when an ad request is received with a particular set of attribute values, if no performance values/scores are available that were calculated from the same parameter values, the system can back-off and consider one or more alternative performance values.

Illustratively, and as indicated above, a first alternative may use a wildcard for the "vertical" parameter. A second alternative may use a wildcard for the "destination" parameter, a third alternative may use a wildcard for the visibility parameter, a fourth may use wildcards in the vertical and visibility parameters, and so on.

Figure 2:
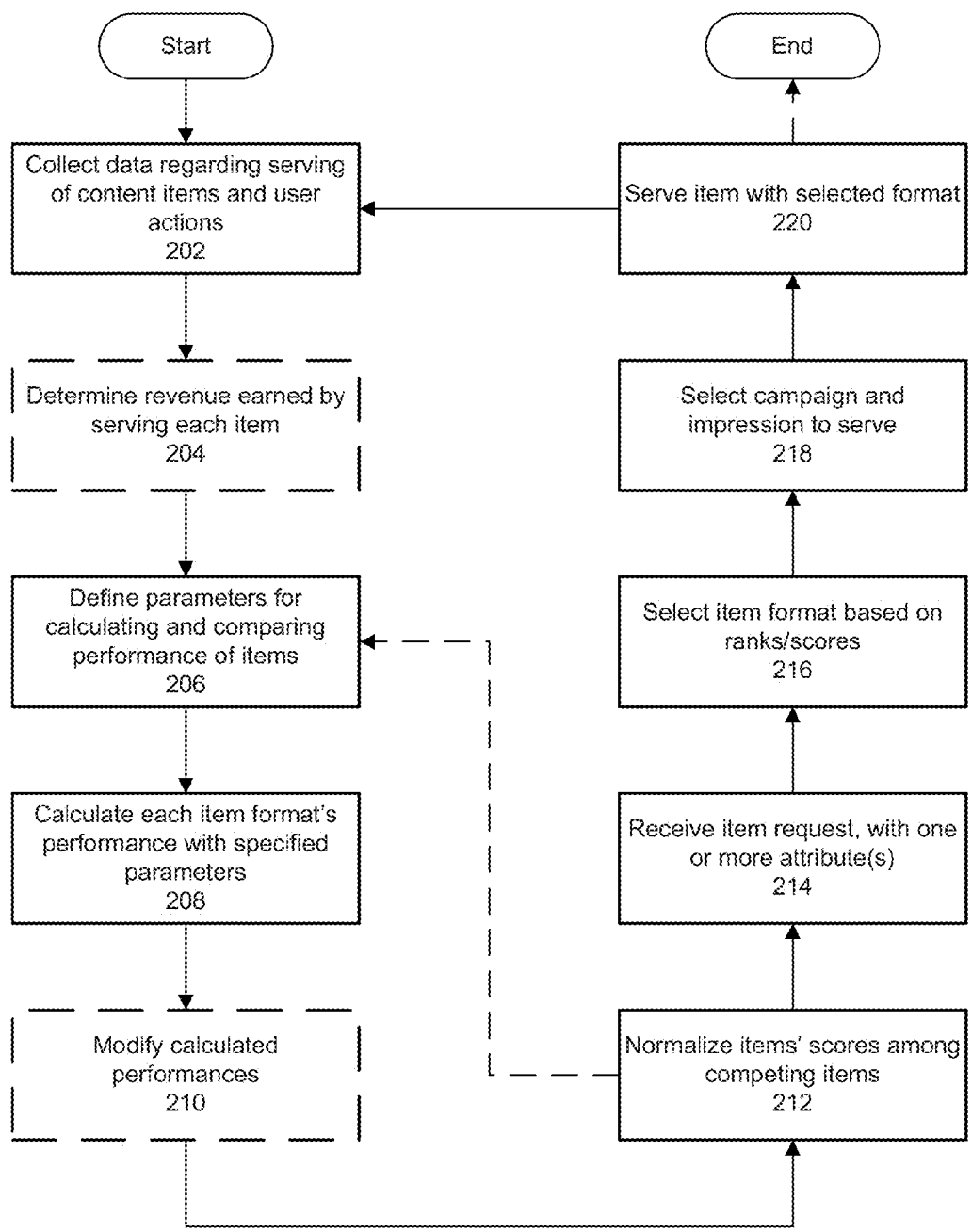
FIG. 2 is a flow chart illustrating a method of automatically selecting and serving a content item with an optimal format, in accordance with some embodiments of the invention.

FIG. 2 is a flow chart illustrating a method of automatically selecting and serving a content item with an optimal format, according to some embodiments of the invention. In these embodiments, a system for serving content, such as system 110 of FIG. 1, continually collects data reflecting the performance of different content items and different formats of those content items, uses it to measure the formats' performances, and uses that performance information when deciding what to serve in response to a new content request. Although the illustrated method is described as it may be implemented with regard to advertisements, other implementations for other types of content may be readily derived from the discussion.

In operation 202, the system accumulates data or metadata regarding one or more advertisements that it served in response to corresponding advertisement requests. In particular, characteristics of each ad that is served are recorded, which may include information such as the advertising campaign for which an ad was served, the impression that was served, the format with which it was served, when it was served, its destination (e.g., a domain, a URL or other network address, a content channel) and so on. Attributes of the request that led to the ad being served may also be recorded if not already reflected in the stored advertisement characteristics.

In addition, the data accumulated in operation 202 includes follow-on activity by viewers of the served ads. This data may indicate whether or not the viewer clicked on an ad, whether he or she purchased an item offered via the ad, whether he or she investigated a subject of the ad (e.g., a product, a service, some information), whether he or she filled out a survey or other request for information that was presented in response to clicking on the ad, etc.

In optional operation 204, the system may determine how much revenue, if any, was generated by serving each of the advertisements for which data was captured in operation 202. Illustratively, this may require the system to determine whether the viewer of the ad clicked on it (e.g., if revenue is based on cost per click), how much the corresponding advertiser has bid to have the ad served (e.g., if revenue is based on CPM), etc. This operation may be required if the performance of ad impression formats is to be measured in terms of revenue. If, however, their performance is to be measured in terms of clicks or other user activity, operation 204 may be omitted.

In operation 206, the system selects, defines or receives a set of parameters for calculating the performance of served advertisements in different environments or in response to ad requests have different attributes. In different embodiments of the invention, any number of parameters and values for the parameters may be selected.

Parameters used for the performance calculations and comparisons in some illustrative embodiments were described above and include some or all of: the destination of a served ad, a window of time during which it was served, the format in which it was served, the ad impression's vertical, and a visibility or prominence of the served advertisement. Supersets or subsets of these parameters may be used in other embodiments.

Illustratively, separate calculations are made for each unique permutation of the selected or specified parameter values, without regard to the actual ad impression or campaign that was served. By making separate calculations for each format for each permutation of the specified parameters, the system will learn where each format performs well and where it performs poorly. Also, the system will thereby have available measures of performance of the different formats for use in deciding which format to serve in response to a new ad request. From specified attributes of the request, the system can identify the same or similar set of parameters for which performance values were calculated, and use those values to select a format.

In operation 208, the system actually performs the calculations described above, for each of the advertisements for which it has the necessary data. In the illustrated method, a performance score is calculated for each advertisement format for which data matching the other parameters is available, as a function of the other parameters (e.g., destination and window of time) and may be represented as $P_f = F(f, d, w)$, where f is a particular ad format, d is the specified destination and w is a specified window of time. In different implementations, performance scores may be revenue-based or click-based. These and other calculations will necessarily differ from implementation to implementation, depending on the parameters in use.

When calculating a revenue-based performance score for a particular format, the function F above may involve adding all the revenue generated by serving ad format f to the specified destination d during the specified window of time w, and dividing that sum by the number of ad requests that were satisfied by serving format f. In contrast, when calculating a click-based performance score for the format, the function F may involve adding all the clicks that were received in response to serving ad format f to the specified destination d during the specified window of time w and dividing that sum by the number of ad requests that were satisfied by serving format f.

In optional operation 210, some or all formats' performance scores may be modified. In particular, in some embodiments of the invention, a modifier a is applied to adjust the magnitude of the performance scores. For example, a may be a positive, real value used as an exponential factor for increasing a performance score, in which case a given format f's score could be written as $P_f = F^\alpha(f, d, w)$. In these embodiments, the higher the value of $\alpha$, the more the calculations may favor an ad format that returns higher revenue than other competing formats. A trade-off may be less variety in the formats that are served and/or one format may tend to be served repetitively until its budget is exhausted, then the format having the next highest revenue may be repetitively served until its budget is exhausted, and so on.

The lower the value of $\alpha$, the more evenly all competing ad formats are treated. At the lower extreme, with $\alpha=0$, all performance scores equal 1 and all formats are considered equal. This may cause the format in which a selected ad impression is served to be selected uniformly and at random.

In operation 212, each competing format's score is normalized with its competitors. In one implementation, normalizing a format's score involves dividing it by the total scores of all formats, in order to assign each format a normalized score between zero and one. Thus, a given format f's normalized score P' among n competing formats may be calculated as:

$$P'_f = \frac{F^\infty(f, d, w)}{\sum_{i=1}^{n} F^\infty(i, d, w)}$$

As described below, the actual format chosen to be served in response to a request may be calculated by sampling a format, wherein the probability of choosing format f is proportional to $P'_f$.

In some embodiments of the invention, the value $F^\infty(f, d, w)$ can be a probability distribution that indicates the probability of occurrence of any score for f, d, w; in particular, it may be a Beta distribution. Thus, instead of a point estimate, determining which format to display may be calculated by:

1. For every format f, sampling a score value denoted as $S^\infty(f, d, w)$ from $F^\infty(f, d, w)$; and
2. Selecting the format f* having the sample with the highest value: $f^* = \text{argmax}_f S^\infty(f, d, w)$.

After operation 212, the system may repeat earlier operations in order to calculate performance scores for some other permutation of parameters, by returning to operation 206. In some embodiments of the invention, performance scores are continually or regularly updated or re-calculated to capture new data received in operation 202. Each format's performance will be scored for different permutations of parameters and continually updated, so that a later decision regarding which ad format to serve in response to a new ad request can be made quickly and with fresh data.

Thus, in some embodiments of the invention, two processes may be envisioned operating in parallel—one to collect data as described in relation to operation 202 and update or calculate performance scores for ad formats, and one as described below to receive and respond to ad requests.

In operation 214, the system receives an ad request having one or more attributes. In the illustrated embodiment of the invention, the attributes include at least a destination. As described above, the destination may encompass any number and combination of factors such as the domain, sub-domain or URL at which the ad will be displayed, and/or the content channel in which it will be served. The attributes may also include the size of the "slot" or "frame" in which the ad(s) served in response to the request will be displayed, the vertical of content with which the ad will be displayed, the visibility with which it will be displayed, etc. Other attributes may be received that identify a member or user to whom the ad will be served, the type of browser being used, metrics and/or demographics of the web site or location in which the ad will be displayed, any restrictions on the type of ad that can or cannot be served (e.g., no adult content, no political message), etc. Some of this information may be used to select a modifier a for use in optional operation 210.

In operation 216, the system selects a specific format in which to serve an advertisement in response to the request. In making this selection, the system will use the normalized performance scores obtained in operation 212, and may consider attributes of the request. In particular, the normalized scores of the competing ad formats may be configured to define a statistical distribution, and each score may correspond to a percentage with which the corresponding format should be served in response to ad requests that the competing formats match. Thus, in operation 216 the system performs a sampling such that, over time and with many ad impressions served, each format's share of the total requests satisfied will approximate the normalized performance score.

In operation 218, the system selects an advertisement campaign and impression available in the format selected in operation 216. In some implementations, an ad impression may be formatted or re-formatted in real-time to place it in the selected format. The process of selecting an ad impression may consider the attributes received in operation 214 and/or other information. For example, if the member to whom the ad will be served is identified, the system may determine what campaigns have been served to him or her before, any demographical or professional information it has regarding that member, etc.

The ad format and impression that are selected in operations 216-218 may partially depend on a size attribute specified in the request. For example, the request may be for a banner ad to be displayed at the top of a web page, which will have a different shape and size than an in-line ad or ad placed at the right-hand side of the page. Thus, in some implementations, only an impression that is available in a format that matches the size attribute (and other specified attributes) will be selected. In some embodiments of the invention, an advertisement campaign/impression may be selected before a specific format is selected; that is, the order of operations 216 and 218 may be reversed.

In operation 220, the system serves the selected ad impression with the selected format. After operation 220, the illustrated method may return to another operation (e.g., operation 202 to collect data on this or some other served impression, operation 214 to accept another ad request) or may end.

Figure 3:
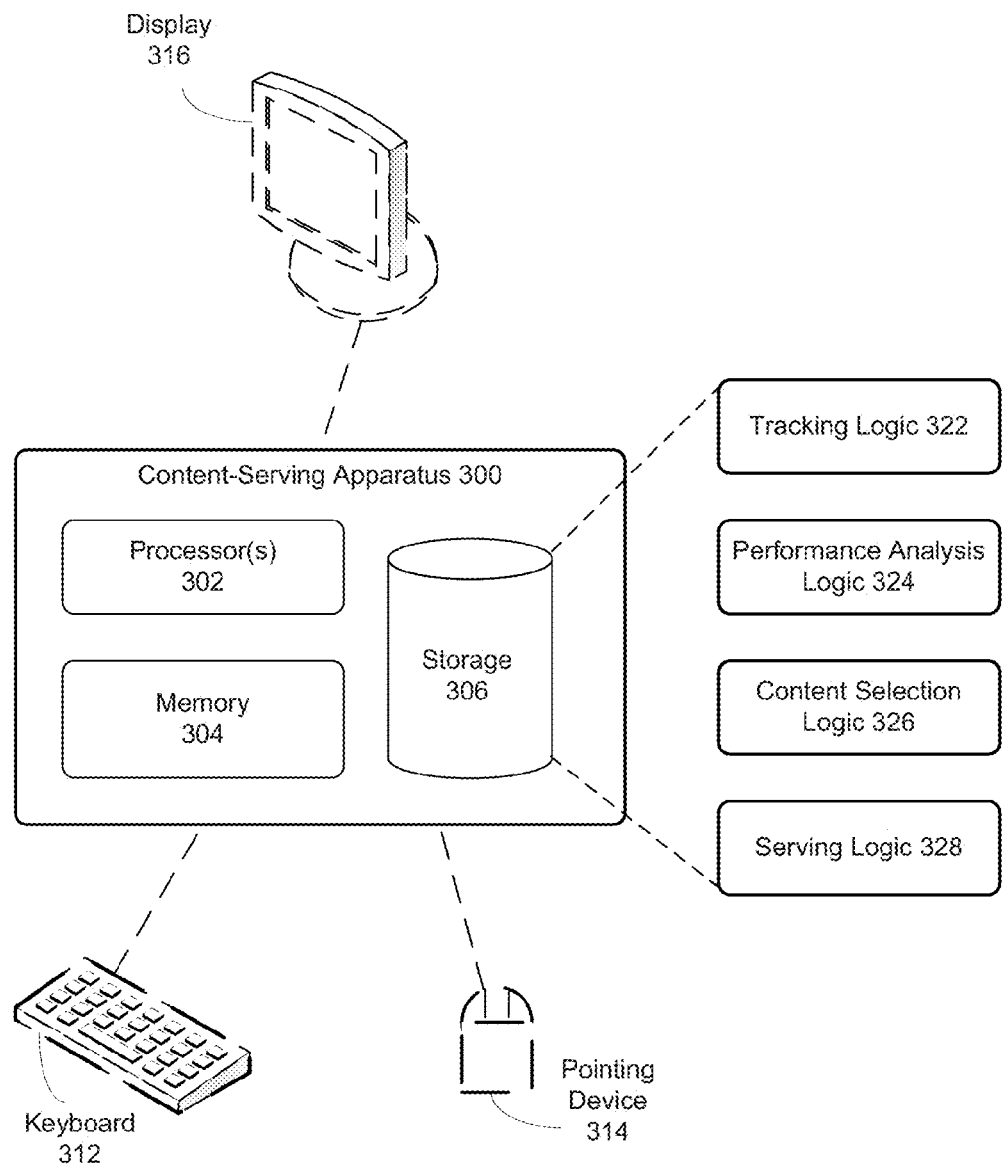
FIG. 3 depicts an apparatus for automatically selecting and serving a content item with an optimal format, in accordance with some embodiments of the invention.

FIG. 3 is a block diagram of an apparatus for automatically selecting and serving a content item with an optimal format, according to some embodiments of the invention.

Content-serving apparatus 300 of FIG. 3 comprises processor(s) 302, memory 304 and storage 306, which may comprise one or more optical and/or magnetic storage components. Apparatus 300 may be coupled (permanently or transiently) to keyboard 312, pointing device 314 and display 316.

Memory 304 stores performance data (e.g., clicks, revenue) while the apparatus computes the performances of different content item formats, performance measurements of those formats as the apparatus selects a format for serving, and/or other information described herein.

Storage 306 of the content-serving apparatus stores content for serving to/for users, user data, tracking data and/or other information. Storage 306 also stores logic that may be loaded into memory 304 for execution by processor 302. Such logic includes tracking logic 322, performance analysis logic 324, content selection logic 326 and serving logic 328. In other embodiments of the invention, any or all of these logic modules or other content may be combined or divided to aggregate or separate their functionality as desired.

Tracking logic 322 comprises processor-executable instructions for tracking content requests received at apparatus 300, tracking the serving of content items to users, tracking user actions on or regarding content items, and/or other behavior. Logic 322 may include, be accompanied by, or used to assemble data reflecting users' activity, content providers' activity and/or other aspects of the apparatus.

Performance analysis logic 324 comprises processor-executable instructions for analyzing user activity, revenue and/or other data regarding the performance of content served from apparatus 300 in different formats. For each format and for each set of selected parameters (e.g., destination, vertical, visibility, time period), logic 324 calculates a corresponding performance value and may optionally normalize the values to facilitate sampling when it is time to respond to another content request.

Content selection logic 326 comprises processor-executable instructions for selecting a content item to be served in response to a content request, and to select a particular format in which to serve the item.

Serving logic 328 comprises processor-executable instructions for handling and responding to content requests. Serving logic 328 may thus process a new request and respond to it by serving a content item selected by logic 326.

Various embodiments of the invention have been described for selecting a format with which to respond to a request for an advertisement (or other type of content). The selected format, when served in response to the request, may include one or more "ads," "impressions" or "creatives," which terms may sometimes be used interchangeably. For example, a candidate format may be designed to include multiple ads/impressions/creatives, possibly depending on the size/shape of the space in which it will be served (which may be termed a slot or a frame). The entire response may be referred to as one advertisement or one impression even though it includes multiple parts (each of which may advertise a different good, service, company or other thing), and each of those multiple parts may be referred to as an advertisement, an impression or a creative.

Thus, the terms "ad," "advertisement" and "impression" should be understood to encompass the content served in response to an ad request—both the overall content served in or with the selected ad format and, in cases in which the format includes multiple parts, the individual advertising messages or creatives that are used to populate the format. However, the term "creative" generally refers to a single, discrete advertising message regarding one good, service, organization or other thing. The creatives with which a multi-part format is populated may be drawn from the same advertising campaign or different advertising campaigns.

The environment in which some embodiments of the invention are executed may incorporate a general-purpose computer or a special-purpose device such as a hand-held computer or communication device. Details of such devices (e.g., processor, memory, data storage, display) may be omitted for the sake of clarity.

Data structures and code described in this detailed description are typically stored on a non-transitory computer-readable storage medium, which may be any device or medium that can store code and/or data for use by a computer system. Non-transitory computer-readable storage media includes, but is not limited to, volatile memory, non-volatile memory, magnetic and optical storage devices such as disk drives, magnetic tape, CDs (compact discs), DVDs (digital versatile discs or digital video discs), or other non-transitory computer-readable media now known or later developed.

The methods and processes described in the detailed description can be embodied as code and/or data, which can be stored in a non-transitory computer-readable storage medium as described above. When a processor or computer system reads and executes the code and/or data stored on the medium, the processor or computer system performs the methods and processes embodied as data structures and code and stored within the medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of selecting a format in which to serve a content item in response to a request, the method comprising:
collecting data regarding activity related to content items served in response to content requests;
for each of a plurality of formats, using a processor to calculate a performance of the format when one or more content items are served with the format to a specified destination during a specified window of time;
receiving a new content request for a content item to be served to the specified destination, the new content request having a set of attributes; and
only after receiving the new content request:
based on the calculated performances, a size of the requested content item, and a visibility with which the requested content item will be displayed, selecting a first format to serve in response to the new content request; and
based at least in part on the attributes, selecting a first content item to serve with the first format.

2. The method of claim 1, wherein calculating a performance of a format comprises calculating an average click-through-rate by:
summing all clicks on content items served with the format to the specified destination during the specified window of time; and
dividing the sum by the number of times the format was served to the specified destination during the specified window of time.

3. The method of claim 1, wherein calculating a performance of a format comprises calculating an average revenue by:
summing all revenue earned for serving content items with the format to the specified destination during the specified window of time; and
dividing the sum by the number of times the format was served to the specified destination during the specified window of time.

4. The method of claim 1, wherein calculating a performance of a given format comprises:
calculating one of:
an average click-through-rate of the given format when served to the specified destination during the specified window of time; and
an average revenue of the given format when served to the specified destination during the specified window of time; and
computing the $\alpha^{th}$ power of the calculated performance, wherein $\alpha$ is a value between approximately 0 and approximately 20.

5. The method of claim 1, wherein calculating a performance of a format comprises:
calculating an average performance of the format over all servings of the format to the specified destination during the specified window of time; and
dividing the average performance of the format by a total of the average performances of all formats in the plurality of formats, to yield a normalized performance of the format.

6. The method of claim 5, wherein selecting the first format comprises:
taking a sample of the plurality of formats based on the normalized performances of all formats in the plurality of formats, wherein the first format is the sample.

7. The method of claim 1, wherein calculating a performance of a given format comprises:
calculating performances of all servings of the given format to the specified destination during the specified window of time and with a specified visibility.

8. The method of claim 1, wherein the set of attributes includes a destination attribute matching the specified destination.

9. The method of claim 8, wherein the destination attribute identifies one of:
a network address;
a domain of content; and
a channel of content.

10. A non-transitory computer-readable medium storing instructions that, when executed by a processor, cause the processor to perform a method of selecting a content item format to serve in response to a request, the method comprising:
collecting data regarding activity related to content items served in response to content requests;
for each of a plurality of formats, calculating a performance of the format when one or more content items are served with the format to a specified destination during a specified window of time;
receiving a new content request for a content item to be served to the specified destination, the new content request having a set of attributes; and
only after receiving the new content request:
based on the calculated performances, a size of the requested content item, and a visibility with which the requested content item will be displayed, selecting a first format to serve in response to the new content request; and
based at least in part on the attributes, selecting a first content item to serve in the first format.

11. A system for selecting a content item format to serve in response to a request, the system comprising:
a content-serving computer for:
receiving an ad request accompanied by a set of attributes that includes a destination attribute identifying a destination; and
only after receiving the ad request, and based on calculated performances of multiple different ad formats served to the destination during a predetermined period of time, a size of the requested ad, and a visibility with which the requested ad will be displayed, selecting a first ad format to serve in response to the ad request; and
a tracking computer for:
recording each serving of an ad format from the content-serving computer; and
collecting performance data regarding each of the multiple different ad formats.

12. The system of claim 11, further comprising:
an off-line server for computing the individual performances of the multiple different ad formats from the collected performance data.

13. A method of selecting a content item format to serve in response to a request, the method comprising:
serving advertisements in response to ad requests, wherein said serving comprises:
receiving an ad request having a set of attributes that includes:
a destination of the requested ad;
a size of the requested ad;
a visibility of the requested ad;

a type of content with which the ad will be displayed; and one or more characteristics of a user to whom the ad will be displayed;

after receiving the ad request, and based at least in part on the set of attributes, selecting an advertisement impression having multiple different formats;

after selecting the advertisement impression, selecting a first format of the selected advertisement impression, based at least in part on a calculated performance of the first format; and serving the selected advertisement impression format; and in parallel with said serving of advertisements, using a processor to calculate performances of multiple advertisement impression formats, including the first format, wherein calculating the performances comprises:

recording each serving of an advertisement impression format;

recording activity involving each served advertisement impression format, if any; and for each of the multiple advertisement impression formats, calculating an average activity over all servings of the advertisement impression format.

14. The method of claim 13, wherein recording a serving of an advertisement impression format comprises recording:

a destination of the advertisement impression;
a time of serving of the advertisement impression; and
an identity of the advertisement impression format.

15. The method of claim 14, wherein the destination attribute identifies one of:

a domain in which the advertisement impression is served;
a network address at which the advertisement impression is served; and
a content channel in which the advertisement impression is served.

16. The method of claim 13, wherein:

the activity involving the first advertisement impression format includes clicks on the first advertisement impression format after it is served; and said calculating an average activity over all servings of the first advertisement impression format comprises:

summing all clicks on the first advertisement impression format; and dividing the sum by the number of times the first advertisement impression format was served, to identify an average click-through-rate.

17. The method of claim 16, wherein said calculating an average activity further comprises calculating the $\alpha^{th}$ power of the average click-through-rate, wherein $\alpha$ is a value between 0 and 20.

18. The method of claim 13, wherein:

the activity involving the first advertisement impression format includes revenue received due to serving of the first advertisement impression format; and said calculating an average activity over all servings of the first advertisement impression format comprises:

summing all revenue received due to serving the first advertisement impression format; and dividing the sum by the number of times the first advertisement impression format was served, to identify an average revenue.

19. The method of claim 18, wherein said calculating further comprises calculating the $\alpha^{th}$ power of the average revenue, wherein $\alpha$ is a value between 0 and 20.

20. The method of claim 13, wherein calculating an average activity over all servings of the advertisement impression format comprises:

calculating performances of all servings of the given format to the specified destination during a specified window of time and with a specified visibility.

21. The method of claim 1, wherein:

the set of attributes includes a first subset of attributes consisting of:

the size of the requested content;
the visibility with which the requested content will be displayed;
the specified destination; and
a type of other content with which it will be served; and selecting a first format comprises:

from the plurality of formats, selecting a format that has a highest calculated performance among all the formats that have calculated performances for the first subset of attributes.

* * * * *